June 24, 1958     D. W. GOHEEN     2,840,614

PROCESS OF MAKING METHYL MERCAPTAN

Filed Oct. 22, 1956

---

AQUEOUS, ALKALINE, UNSULFONATED LIGNIN-CONTAINING SOLUTION

↓

INSURE THAT SOLUTION HAS A pH OF FROM 10-14, PREFERABLY FROM 11-13

↓

MIX WITH INORGANIC SULFUR-BEARING MATERIAL, e.g. ELEMENTAL SULFUR OR A WATER-SOLUBLE SULFIDE, CAPABLE OF CONVERTING LIGNIN METHOXYL TO METHYL MERCAPTAN WHEN IN ALKALINE SOLUTION

↓

HEAT MIXTURE IN A REACTION ZONE AT 170-500° C., PREFERABLY 200-300° C.

↓

FLASH OFF METHYL MERCAPTAN

↓

METHYL MERCAPTAN PRODUCT

*INVENTOR.*
DAVID W. GOHEEN
BY Eugene P. Farley

United States Patent Office 2,840,614
Patented June 24, 1958

2,840,614

PROCESS OF MAKING METHYL MERCAPTAN

David W. Goheen, Camas, Wash., assignor to Crown Zellerbach Corporation, San Francisco, Calif., a corporation of Nevada Application October 22, 1956, Serial No. 617,334

19 Claims. (Cl. 260—609)

This invention relates to a process of making methyl mercaptan.

Methyl mercaptan is a material having important commercial uses, including its application as an odorant and as a starting material for the synthesis of various derivative chemicals. It is converted readily to dimethyl sulfide, however, and accordingly its production is attended by the difficulty that a substantial proportion of the methyl mercaptan produced by a given procedure may be isolated in the form of a dimethyl sulfide end product.

Accordingly it is the general object of this invention to provide a process for making methyl mercaptan as the principal product of a reaction which, if permitted to go to completion, would result in the conversion of the methyl mercaptan to dimethyl sulfide.

It is another object of this invention to provide a process for making methyl mercaptan from unsulfonated lignins such as alkali lignins, which are available commercially in large quantities at low cost.

Still a further object of this invention is the provision of a process for making methyl mercaptan inexpensively and in large quantities on a commercial scale.

It is another object of the present invention to provide a process for making methyl mercaptan which is substantially uncontaminated with dimethyl sulfide.

Generally stated, the herein described process of making methyl mercaptan comprises providing an aqueous, alkaline, unsulfonated lignin-containing solution having a pH of from 10–14, and forming a mixture of the solution with an inorganic, sulfur-bearing material capable of reacting with the methoxyl groups of the lignin to form methyl mercaptan when it is introduced into the alkaline solution. Such materials include elemental sulfur, and the inorganic, water-soluble sulfides, polysulfides, hydrosulfides, or thiosulfates.

The resulting mixture is heated in a reaction zone at a temperature of from 170–500° C. for a time sufficient to produce a substantial amount of methyl mercaptan. The methyl mercaptan product then is removed from the reaction zone substantially as soon as it is produced, and before it can react further to form dimethyl sulfide. In this manner the methoxyl content of the unsulfonated lignin may be converted in good yields to a substantially pure methyl mercaptan product, leaving a pumpable lignin liquor which may be processed for the removal of inorganic pulping agents or other values which it may contain.

Considering the foregoing in greater detail and with particular reference to the single sheet of drawings consisting of a flow plan of the hereindescribed process:

The unsulfonated lignin-containing solution which is the starting material for the herein described process may be obtained from various sources. Thus it may be obtained from the alkaline pulping, alcoholysis, or acid hydrolysis of lignocellulose, or by extraction thereof with hydrotropic solutions of aromatic sulfonates such as sodium xylene sulfonate. However, it may preferably comprise the spent pulping liquor resulting from the digestion of lignocellulose by the sulfate and soda processes, respectively. The lignocellulose, in turn, may comprise hardwood or softwood of the various tree species conventionally employed in papermaking. It also may be derived from bamboo and agricultural residues such as straw, corn cobs, and bagasse.

As is will known, the liquors derived from the alkaline pulping of these materials contain chemically modified, unsulfonated lignin derivatives generically termed alkali lignins in the papermaking art, those derived from sulfate pulping being termed specifically thiolignins. These derivatives contain in their molecular structure methoxyl groups which potentially are reactive with sulfur bearing reagents to form methyl mercaptan. Accordingly, they are used as the starting material for the synthesis of that product by the presently described process.

In order to obtain maximum yields of methyl mercaptan, the solids content of the liquor should be adjusted to a value of from 30–60% by weight by evaporation in evaporators of known construction before reacting the lignin-containing liquor with the sulfur bearing reagent. Also, the pH of the liquor is adjusted to a value of from 10–14, preferably from 11–13, if its pH as it comes from the pulp mill does not inherently fall within that range. Such adjustment of the pH is desirable since at pH levers below 10 the liquor tends to solidify during heating with the sulfur bearing material. On the other hand, if the liquor pH is above 14, conversion of the methyl mercaptan to dimethyl sulfide is encouraged, thereby cutting down the yield of the desired product.

If the pH of the spent liquor as it comes from the pulp mill is too high, it may be reduced to the desired level by adding an acidic material such as a mineral or organic acid or acid salt. Preferred examples of acidic materials for this purpose are sulfuric acid, hydrochloric acid, alum and the like. If the pH of the spent liquor is below 10, it may be raised by the addition of a suitable alkaline material, preferably sodium hydroxide.

The aqueous alkaline solution containing alkali lignin and having a controlled solids content and pH, then is mixed with an inorganic sulfur-bearing material capable of reacting with the methoxyl content of the lignin to form methyl mercaptan when it is introduced into the solution. A diversity of inorganic sulfur bearing materials may be used for this purpose. Examples are elemental sulfur; the water-soluble sulfides, e. g. the alkali-metal sulfides including sodium sulfide and potassium sulfide; ammonium sulfide; hydrogen sulfide; the water-soluble thiosulfates, particularly sodium thiosulfate; the water-soluble polysulfides, particularly sodium polysulfide; calcium polysulfide; and the water-soluble hydrosulfides, particularly sodium hydrosulfide. Elemental sulfur and sodium sulfide are preferred members of the foregoing group because of their availability and low cost.

The amount of sulfur bearing material to be mixed with the alkaline solution of alkali lignin is variable depending upon such factors as the solids content of the solution, its derivation, and the identity of the sulfur bearing material employed. For example, if the solution comprises a waste liquor from the sulfate process, it already contains a substantial amount of sulfur, part of this being combined chemically with the lignin, part with other organic components of the liquor, part being contained in the volatile organic sulfur-containing components of the liquor, and part being associated with sodium ions.

In general, however, sufficient sulfur bearing material is added to provide a total sulfur content of up to 15% by weight based on the liquor's solids, and preferably from about 3% to the stoichiometric equivalent of sulfur required for conversion of the methoxyl content of the lignin components to methyl mercaptan. Where the liquor is derived from the usual sulfate process, from about 3 to 15% by weight based on the liquor solids of sulfur, or its equivalent in sulfur-containing compounds, should be present to effectuate the desired conversion of lignin methoxyls to methyl mercaptan in a relatively high yield.

It has been discovered that the amount of sulfur which may be added as elemental sulfur is limited in the case of some liquors. For example, in the case of soda spent pulping liquor, up to 60% of the sulfur may be supplied as elemental sulfur. If more than this proportion of elemental sulfur is used, the yield of methyl mercaptan may be decreased significantly. In the case of kraft liquor, however, any additional sulfur required over that already present in the liquor may be added as elemental sulfur.

The mixture of unsulfonated lignin solution and sulfur bearing material is placed in a reactor provided with means for withdrawing the methyl mercaptan continuously, substantially as soon as it is formed, for separating it from any dimethyl sulfide which may be formed, and for condensing it. It may be placed, for example, in a reactor fitted with a valve suitable for continuous relief and communicating first with a water cooled condenser for condensing the dimethyl sulfide and then with a trap cooled with a freezing mixture adequate for reducing the temperature to one at which the methyl mercaptan will condense.

After introduction of the mixture into the reactor, it is heated at a level of from 170–500° C., since at temperatures lower than 170° C. the desired reaction takes place very slowly or not at all and at temperatures over 500° C. extensive charring of the lignin occurs. A preferred reaction range is from 200–300° C.

The reaction is carried on at the indicated temperature for a time sufficient to achieve substantial conversion of the lignin methoxyl groups to methyl mercaptan. This may vary from a period of but a few seconds or few minutes at elevated temperatures, to one of an hour or two at lower temperatures.

Whatever the total reaction period, the conditions are adjusted so that the methyl mercaptan is withdrawn from the reaction vessel substantially as soon as it is formed. This minimizes the formation of dimethyl sulfide. After its withdrawal, it is passed first through the condenser where any dimethyl sulfide which may be present is condensed. The remaining vapor is passed through a cold trap to condense the methyl mercaptan. As an alternative, the gases withdrawn from the reactor may be condensed under pressure to give a liquid from which methyl mercaptan can be isolated by a suitable fractional distillation.

The methyl mercaptan product then may be applied to various commercial uses in the form in which it is obtained, or it may be further purified by conventional methods, as by distillation, or by reaction with an alkaline material to form a mercaptide which thereafter may be treated with acid to liberate pure methyl mercaptan.

The above described procedure is illustrated further in the following examples:

*Example 1*

An aqueous alkaline thiolignin solution comprising kraft black liquor having a solids content of 53.2% by weight and resulting from the pulping of a hemlock-Douglas fir mixture was treated with 12 N sulfuric acid until its pH was adjusted to 12.4. 4900 grams of the liquor was mixed with 45 grams of elemental sulfur and placed in an autoclave provided with heating and agitating means and connected through a relief valve first to a water cooled condenser fitted with a receiver and then to a trap cooled with Dry Ice and acetone.

Heating and stirring of the reaction mixture were started at substantially room temperature. The temperature of the mixture was increased to 215° C. and maintained at 215–220° C. for 35 minutes with the gaseous reaction product being continually vented. At the end of the reaction period, the Dry Ice trap contained 63.2 grams of methyl mercaptan and 11.8 grams dimethyl sulfide. The yield of methyl mercaptan was 2.43% by weight based on the liquor solids.

*Example 2*

This example illustrates the application of the presently described process using a reaction temperature somewhat higher than that employed in Example 1.

4900 grams of kraft black liquor derived from the pulping of a hemlock-Douglas fir wood mixture and having a solids content of 53.2% and a pH of 12.9 was placed in an autoclave similar to that described in Example 1 and mixed with 45 grams of elemental sulfur. Stirring and heating were started. When the temperature reached 160° C. venting of the gases was begun. When the temperature reached about 205° C., methyl mercaptan began to distill off.

Heating was continued to 240° C. with constant venting of the gases. Distillation proceeded for 30 minutes, the gases being first passed through a water cooled condenser and then through a Dry Ice trap. At the end of the reaction period, the first receiver condensate contained 7 grams methyl mercaptan and 18.4 grams dimethyl sulfide. The Dry Ice trap contained 44.3 grams methyl mercaptan and 17.7 grams dimethyl sulfide. The total yield of methyl mercaptan was 1.96% based on the liquor solids.

*Example 3*

This example illustrates the application of the presently described procedure to the production of methyl mercaptan from red alder soda spent pulping liquor.

5000 grams of soda liquor obtained from pulping red alder and having 51.5% by weight of solids were mixed with 250 grams of sodium sulfide. The pH of the resulting mixture was adjusted with sulfuric acid to a level of 12.1. Thereafter 45 grams of sulfur were added to the mixture, which then was stirred and heated in an autoclave as described in the preceding examples.

After the temperature of the mixture reached 160° C., venting was begun and continued for the remainder of the reaction. Heating was continued until the temperature of the mixture reached 215° C. The mixture was maintained at a temperature level from 215–220° C. for 30 minutes.

At the end of this time the first condensate contained 3.8 grams of methyl mercaptan and 13.1 grams of dimethyl sulfide. The Dry Ice cooled trap contained 53.5 grams methyl mercaptan and 12.5 grams dimethyl sulfide. The yield of methyl mercaptan thus was 2.22% based on the liquor solids content.

*Example 4*

This example illustrates the application of the herein described process to the production of methyl mercaptan from bagasse sulfate spent pulping liquor.

5000 grams of bagasse spent liquor having a solids content of 43.2% by weight was treated with sulfuric acid until its pH reached a level of 12.4. 36 grams of sulfur were then mixed with it and the resulting mixture heated and vented as described in Example 3. At the end of the reaction period of 30 minutes, 6 grams of a mixture of dimethyl sulfide and polysulfides were found in the first condensate and 35.1 grams methyl mercaptan and 5.9 grams dimethyl sulfide were recovered from the trap. The yield of methyl mercaptan thus was 1.61% based on the liquor solids.

*Example 5*

This example illustrates the application of the presently described procedure to the production of methyl mercaptan using a somewhat reduced amount of added sulfur bearing material.

5000 grams of 53.4% by weight solids sulfate black liquor, derived from pulping softwoods, having a pH adjusted to 12.4 with sulfuric acid were placed in an autoclave and reacted with 34.0 grams of sulfur. The mixture was heated with stirring to a temperature of 170° C., when venting of the gases was initiated. Heating and venting were continued to 220° C. and the mixture held at this temperature with continuous distillation of the reaction product for 30 minutes.

At the end of the reaction period there was only a trace of organic material in the first condensate. In the Dry Ice cooled trap were 60 grams of condensed product consisting of 7.6 grams dimethyl sulfide and 52.4 grams methyl mercaptan. The yield of methyl mercaptan was 1.96%, based on liquor solids.

Example 6

This example illustrates the application of an elevated temperature in the presently described procedure.

The procedure of Example 5 was repeated with the exception that the amount of sulfur added was 45 grams and the maximum temperature achieved during the reaction period was 270° C. In this case the yield of methyl mercaptan in the first condensate was 0.16% and in the ice trap 1.9%, or a total yield of 2.05%, based on liquor solids. The yield of dimethyl sulfide in the first condensate was 0.51% and in the ice trap 1.2%, or a total yield of 1.71%.

Example 7

This example illustrates the application of the presently described procedure to a soda liquor using a mixture of sodium sulfide and sulfur as the sulfur bearing materials.

500 grams of soda liquor having a solids content of 51.5% by weight of a pH of 12.4 was placed in an autoclave and treated with a mixture of 12.9 grams of elemental sulfur and 44 grams sodium sulfide. The mixture was heated to a temperature of 170° C. when venting of the gases was begun.

Heating was continued with venting to a temperature of 220° C. and the mixture held at this temperature for 30 minutes with continuous flashing off of the gaseous reaction products. At the end of the reaction period the ice trap contained 6 grams of methyl mercaptan, the yield thus being 2.34% by weight.

Thus it will be apparent that by the present invention I have provided a process for making methyl mercaptan which is effective in converting the methoxyls of unsulfonated lignins to the desired end product in high yields without producing a major proportion of dimethyl sulfide. The process is well suited for application to the use of inexpensive starting materials such as kraft and soda spent pulping liquors and accordingly may be employed for the production of a very substantial amount of methyl mercaptan on a large commercial scale. Using the presently described process, for example, a commercial alkaline pulp mill having a capacity of 400 tons of pulp per day can produce as a valuable product about 24,000 pounds per day of methyl mercaptan. Also, the methyl mercaptan is obtained in a form which is substantially pure and well adapted for use in its various commercial applications.

Having thus described my invention in preferred embodiments, I claim as new and desire to protect by Letters Patent:

1. A process of making methyl mercaptan which comprises providing an aqueous, alkaline, unsulfonated lignin-containing solution having a pH of from 10–14, reacting said solution with an inorganic sulfur-bearing material comprising at least one member of the group consisting of elemental sulfur, water-soluble sulfides, water-soluble hydrosulfides, water-soluble polysulfides, and water-soluble thiosulfates, the reaction being effectuated in a reaction zone at a temperature of from 170–500° C. for a time sufficient to produce a substantial amount of methyl mercaptan while leaving a liquid and pumpable residual lignin containing solution, and removing the methyl mercaptan from the reaction zone substantially as soon as it is produced.

2. The process of claim 1 wherein the solids content of the aqueous alkaline solution is from 30–60% by weight.

3. The process of claim 1 wherein the sulfur-bearing material is mixed with the lignin-containing solution in an amount not exceeding substantially the stoichiometric equivalent required for conversion of the methoxyl content of the lignin components thereof to methyl mercaptan.

4. A process of making methyl mercaptan which comprises providing an aqueous, alkaline, unsulfonated lignin-containing solution having a pH of from 10–14 and a solids content of from 30–60% by weight, forming a mixture of said solution with an inorganic sulfur-bearing material comprising at least one member of the group consisting of elemental sulfur, water-soluble sulfides, water-soluble hydrosulfides, water-soluble polysulfides, and water-soluble thiosulfates, the amount of said material not exceeding substantially the stoichiometric equivalent required for conversion of the methoxyl content of the lignin components thereof to methyl mercaptan, heating the mixture in a reaction zone at a temperature of from 170°–500° C. for a time sufficient to produce a substantial amount of methyl mercaptan, and removing the methyl mercaptan from the reaction zone substantially as soon as it is produced.

5. The process of claim 4 wherein the mixture is heated in the reaction zone at a temperature of from 200–300° C.

6. The process of claim 4 wherein the unsulfonated lignin-containing solution comprises alkali lignin.

7. The process of claim 4 wherein the unsulfonated lignin-containing solution comprises thiolignin.

8. The process of claim 4 wherein the unsulfonated lignin-containing solution comprises spent pulping liquor resulting from the digestion of lignocellulose by an alkaline pulping procedure.

9. The process of claim 4 wherein the aqueous, alkaline, unsulfonated lignin-containing solution comprises spent pulping liquor resulting from the digestion of lignocellulose by the sulfate pulping procedure.

10. The process of claim 4 wherein the inorganic sulfur-bearing material comprises elemental sulfur.

11. The process of claim 4 wherein the inorganic sulfur-bearing material comprises sodium sulfide.

12. The process of claim 4 wherein the pH of the aqueous alkaline solution is from 11–13.

13. The process of making methyl mercaptan which comprises providing a spent pulping liquor resulting from the digestion of lignocellulose by an alkaline pulping procedure, said liquor having a pH of from 10–14 and a solids content of from 30–60% by weight, forming a mixture of said liquor with an inorganic sulfur-bearing material comprising at least one member of the group consisting of elemental sulfur, water-soluble sulfides, water-soluble hydrosulfides, water-soluble polysulfides, and water-soluble thiosulfates, the amount of said material not exceeding substantially the stoichiometric equivalent required for conversion of the methoxyl content of the lignin components thereof to methyl mercaptan, heating the mixture in a reaction zone at a temperature of from 170–500° C. for a time sufficient to produce a substantial amount of methyl mercaptan while leaving a liquid and pumpable residual liquor, and flashing off the methyl mercaptan from the reaction zone substantially as soon as it is produced.

14. The process of claim 13 wherein the spent pulping liquor results from the digestion of lignocellulose by the soda pulping procedure and not over about 60% of the sulfur-bearing material consists of elemental sulfur.

15. The process of claim 13 wherein the pH of the spent pulping liquor is from 11–13 and the temperature at which the mixture is heated in the reaction zone is from 200–300° C.

16. The process of making methyl mercaptan which comprises providing a spent pulping liquor resulting from the digestion of lignocellulose by the sulfate pulping procedure, said liquor having a pH of from 10–14 and a solids content of from 30–60% by weight, forming a mixture of said liquor with elemental sulfur, the total amount of sulfur in the mixture not exceeding substantially the stoichiometric equivalent required for conversion of the methoxyl content of the lignin components thereof to methyl mercaptan, heating the mixture in a reaction zone at a temperature of from 200–300° C. for a time sufficient to produce a substantial amount of methyl mercaptan, and flashing off continuously the methyl mercaptan from the reaction zone substantially as soon as it is produced.

17. The process of claim 16 wherein the pH of the spent pulping liquor is from 11–13.

18. The process of claim 17 wherein the spent pulping liquor results from the digestion of wood.

19. The process of claim 17 wherein the spent pulping liquor results from the digestion of non-woody lignocellulose.

References Cited in the file of this patent
UNITED STATES PATENTS 2,711,430    Hagglund et al. _____ June 21, 1955

UNITED STATES PATENT OFFICE
CERTIFICATE OF CORRECTION

Patent No. 2,840,614                                            June 24, 1958

David W. Goheen

It is hereby certified that error appears in the printed specification of the above numbered patent requiring correction and that the said Letters Patent should read as corrected below.

Column 1, lines 48 and 49, for "polysulfies" read -- polysulfides --; column 2, line 7, for "will" read -- well --; line 26, for "levers" read -- levels --; column 5, line 35, for "of" read -- and --; column 6, line 29, after "mercaptan" and before the comma, insert -- while leaving a liquid and pumpable residual lignin containing solution; column 8, line 2, after "mercaptan" and before the comma, insert -- while leaving a liquid and pumpable residual liquor --.

Signed and sealed this 4th day of November 1958.

(SEAL)
Attest:

KARL H. AXLINE                                              ROBERT C. WATSON
Attesting Officer                                          Commissioner of Patents